United States Patent
Kitayama et al.

(10) Patent No.: US 11,011,062 B2
(45) Date of Patent: May 18, 2021

(54) PEDESTRIAN DETECTION APPARATUS AND PEDESTRIAN DETECTION METHOD

(71) Applicant: DENSO CORPORATION, Kariya (JP)

(72) Inventors: Shinya Kitayama, Kariya (JP); Hirokazu Oyabu, Kariya (JP); Masaaki Hirose, Kariya (JP); Toshiyuki Kondo, Kariya (JP); Tadashi Kamada, Kariya (JP)

(73) Assignee: DENSO CORPORATION, Kariya (JP)

( * ) Notice: Subject to any disclaimer, the term of this patent is extended or adjusted under 35 U.S.C. 154(b) by 138 days.

(21) Appl. No.: 16/315,411

(22) PCT Filed: Jun. 5, 2017

(86) PCT No.: PCT/JP2017/020809
§ 371 (c)(1),
(2) Date: Jan. 4, 2019

(87) PCT Pub. No.: WO2018/008314
PCT Pub. Date: Jan. 11, 2018

(65) Prior Publication Data
US 2019/0213887 A1    Jul. 11, 2019

(30) Foreign Application Priority Data
Jul. 7, 2016    (JP) .............................. JP2016-135404

(51) Int. Cl.
*G08G 1/16*       (2006.01)
*B60Q 1/52*       (2006.01)
(Continued)

(52) U.S. Cl.
CPC ............. *G08G 1/166* (2013.01); *B60Q 1/525* (2013.01); *B60R 21/00* (2013.01);
(Continued)

(58) Field of Classification Search
None
See application file for complete search history.

(56) References Cited

U.S. PATENT DOCUMENTS

| 2011/0140919 A1* | 6/2011 | Hara ..................... G08G 1/163 340/907 |
| 2014/0112538 A1 | 4/2014 | Ogawa et al. |

(Continued)

FOREIGN PATENT DOCUMENTS

| JP | 2002-074595 A | 3/2002 |
| JP | 2005-165422 A | 6/2005 |

(Continued)

*Primary Examiner* — Vu Le
*Assistant Examiner* — Tracy Mangialaschi
(74) *Attorney, Agent, or Firm* — Maschoff Brennan

(57) ABSTRACT

A target pedestrian who is present within a range of a predetermined distance from a roadway is detected. Whether or not the target pedestrian has gazed at a crossing destination and whether or not the target pedestrian has performed a safety confirmation regarding vehicles traveling on the roadway are determined based on a gaze direction of the target pedestrian. As a result, when the target pedestrian has performed one action of either of gazing at the crossing destination and the safety confirmation, and then performed the other action within a predetermined amount of time, the target pedestrian is detected as a pre-crossing pedestrian who has an intention to cross the roadway. Consequently, a pedestrian who is attempting to cross the roadway can be accurately detected at a stage before the pedestrian actually starts crossing.

18 Claims, 13 Drawing Sheets

(51) Int. Cl.
- *G06K 9/00* (2006.01)
- *G08G 1/005* (2006.01)
- *B60R 21/00* (2006.01)
- *B60Q 1/54* (2006.01)
- *G06T 7/20* (2017.01)

(52) U.S. Cl.
CPC ......... *G06K 9/00348* (2013.01); *G08G 1/005* (2013.01); *G08G 1/16* (2013.01); *B60Q 1/54* (2013.01); *G06T 7/20* (2013.01)

(56) References Cited

U.S. PATENT DOCUMENTS

2017/0057497 A1\* 3/2017 Laur .................. G06K 9/00805
2017/0327112 A1\* 11/2017 Yokoyama ......... G06K 9/00335

FOREIGN PATENT DOCUMENTS

| JP | 2005165422 A | \* | 6/2005 |
|----|---|---|---|
| JP | 2007-264778 A | | 10/2007 |
| JP | 2010-102437 A | | 5/2010 |
| JP | 2011-123636 A | | 6/2011 |
| JP | 2014-059841 A | | 4/2014 |
| JP | 2015-185075 A | | 10/2015 |
| JP | 2015185075 A | \* | 10/2015 |
| WO | 2012/172629 A1 | | 2/2015 |
| WO | 2016/098238 A1 | | 6/2016 |

\* cited by examiner

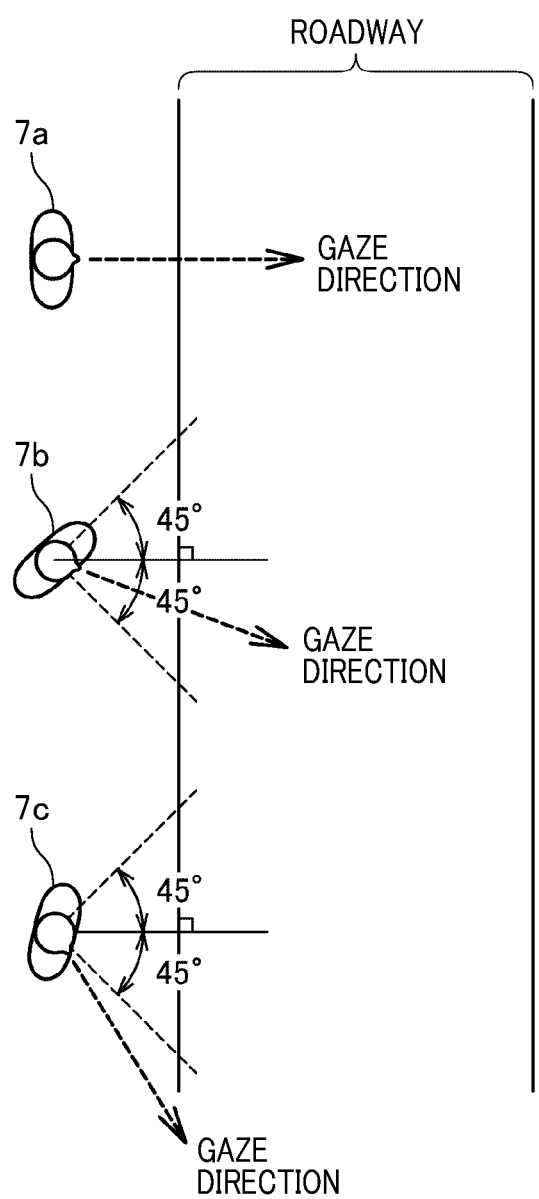

"A PEDESTRIAN IS ATTEMPTING TO CROSS"

PEDESTRIAN DETECTION APPARATUS AND PEDESTRIAN DETECTION METHOD

CROSS-REFERENCE TO RELATED APPLICATIONS

The present application is a national stage application of PCT Application No. PCT/JP2017/020809, filed on Jun. 5, 2017, which claims the benefit of priority from Japanese Patent Application No. 2016-135404, filed on Jul. 7, 2016, the descriptions of which are incorporated herein by reference.

TECHNICAL FIELD

The present invention relates to a technology for detecting a pedestrian who is present in the periphery of a vehicle. In particular, the present invention relates to a technology for detecting a pedestrian who is attempting to cross a roadway at a stage before the pedestrian actually starts crossing.

BACKGROUND ART

As a result of advancements in image recognition technology, today, a pedestrian who is present in the periphery of a vehicle can be detected with sufficient accuracy from a captured image acquired by an onboard camera. As a next development goal, enabling determination with sufficient accuracy regarding whether the detected pedestrian is merely walking on a sidewalk, or is attempting to step off the sidewalk and cross a roadway is desired.

In response to such demands, a technology for determining whether or not a pedestrian is attempting to cross a roadway through detection of time-series variations in position and time-series changes in movement speed of the pedestrian has been proposed (PTL 1). In this proposed technology, it is determined whether or not the pedestrian is attempting to cross the roadway based on whether or not the detected time-series variations correspond to a pattern of time-series variations for when a pedestrian is attempting to cross a roadway.

CITATION LIST

Patent Literature

[PTL 1] JP-A-2010-102437

SUMMARY OF INVENTION

In the above-described proposed technology, the movement of the pedestrian crossing the roadway is detected. Therefore, at the time of detection, the pedestrian has already started crossing. A pedestrian who is attempting to cross is not able to be detected at a stage before the pedestrian starts crossing.

An object of the present disclosure is to provide a technology that enables a pedestrian who is attempting to cross a roadway to be accurately detected at a stage before the pedestrian starts crossing.

According to a first aspect of the present disclosure, a pedestrian detection apparatus and a pedestrian detection method detect a target pedestrian who is present within a range of a predetermined distance from a roadway in a captured image of an onboard camera. Then, whether or not the target pedestrian has gazed at a crossing destination and whether or not the target pedestrian has performed a safety confirmation regarding vehicles traveling on the roadway are determined based on a gaze direction of the target pedestrian. As a result, when the target pedestrian has performed one action of either gazing at the crossing destination or the safety confirmation, and then performed the other action within a predetermined amount of time, the target pedestrian is detected as a pre-crossing pedestrian who has an intention to cross the roadway.

Based on knowledge newly discovered by the inventors of the present application, a pedestrian who is attempting to cross a roadway performs gazing at a destination to which the pedestrian is to cross and a safety confirmation regarding vehicles that are traveling on the roadway that the pedestrian is to cross, with a probability that is high enough to be considered 100%. Therefore, if a target pedestrian, who has performed gazing at the crossing destination and the safety confirmation regarding vehicles within a predetermined amount of time, is detected as the pre-crossing pedestrian who has an intention to cross the roadway, a pedestrian who is attempting to cross the roadway can be accurately detected at a stage before the pedestrian actually starts crossing.

BRIEF DESCRIPTION OF DRAWINGS

FIG. 7A is an explanatory diagram of a method for determining whether or not the target pedestrian is gazing at a crossing destination;

DESCRIPTION OF EMBODIMENTS

Embodiments will hereinafter be described to clarify the details of the present invention, described above.

A. Apparatus Configuration

Figure 1:
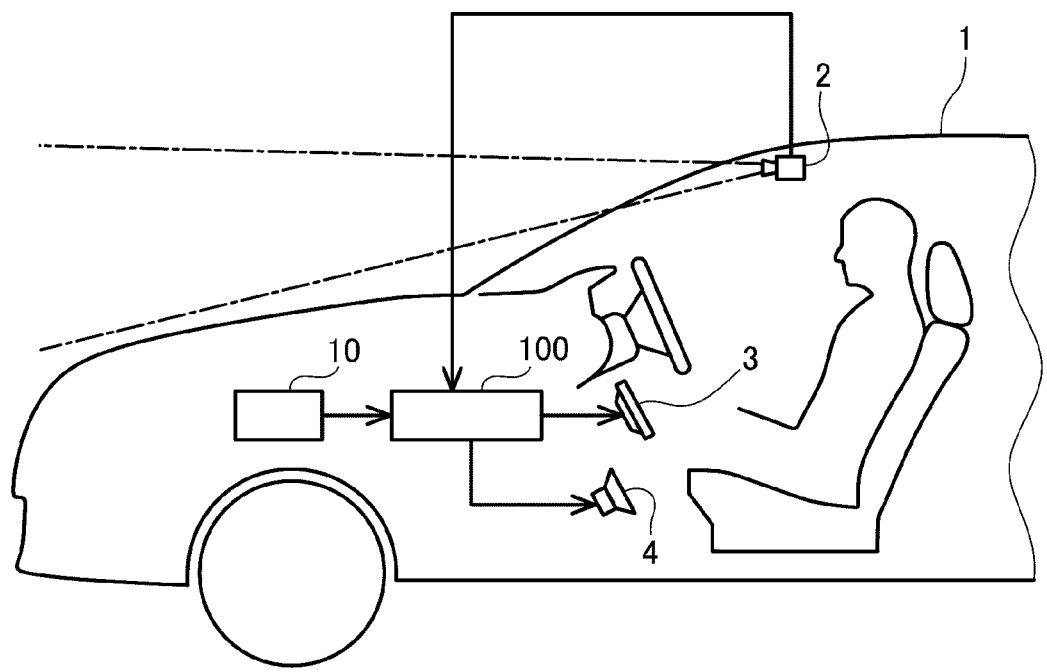
FIG. 1 is an explanatory diagram of a vehicle 1 in which a pedestrian detection apparatus 100 according to a present embodiment is mounted.

FIG. 1 shows an overall configuration of a vehicle 1 in which a pedestrian detection apparatus 100 according to a present embodiment is mounted. As shown in FIG. 1, in addition to the pedestrian detection apparatus 100, an onboard camera 2, a monitor 3, a speaker 4, a navigation apparatus (hereafter, a navi apparatus) 10, and the like are mounted in the vehicle 1.

The onboard camera 2 captures an image of a state ahead at a predetermined time interval and outputs the acquired captured image to the pedestrian detection apparatus 100.

The navi apparatus 10 stores therein map data. The navi apparatus 10 detects a current position of the vehicle 1 and outputs the map data regarding the surroundings of the current position to the pedestrian detection apparatus 100.

The pedestrian detection apparatus 100 analyzes the captured image received from the onboard camera 2 and detects a pedestrian that appears in the captured image. Furthermore, the pedestrian detection apparatus 100 determines whether or not the detected pedestrian is a pedestrian who is attempting to cross a roadway, at a stage before the pedestrian starts crossing. A method for determining whether or not the pedestrian is attempting to cross at a stage before the pedestrian starts crossing will be described in detail hereafter. A pedestrian who is attempting to cross a roadway but has not yet started crossing will be referred to, hereafter, as a "pre-crossing pedestrian."

In addition, the navi apparatus 10 is also connected to the pedestrian detection apparatus 100 of the present example. Therefore, to determine whether or not a pedestrian is a pre-crossing pedestrian, information on the current position of the vehicle 1 and map information regarding the periphery can be acquired from the navi apparatus 10 and used.

Furthermore, the pedestrian detection apparatus 100 outputs the result of the detection of a pre-crossing pedestrian among the pedestrians appearing in the captured image to the driver, using the monitor 3 and the speaker 4.

Figure 2:
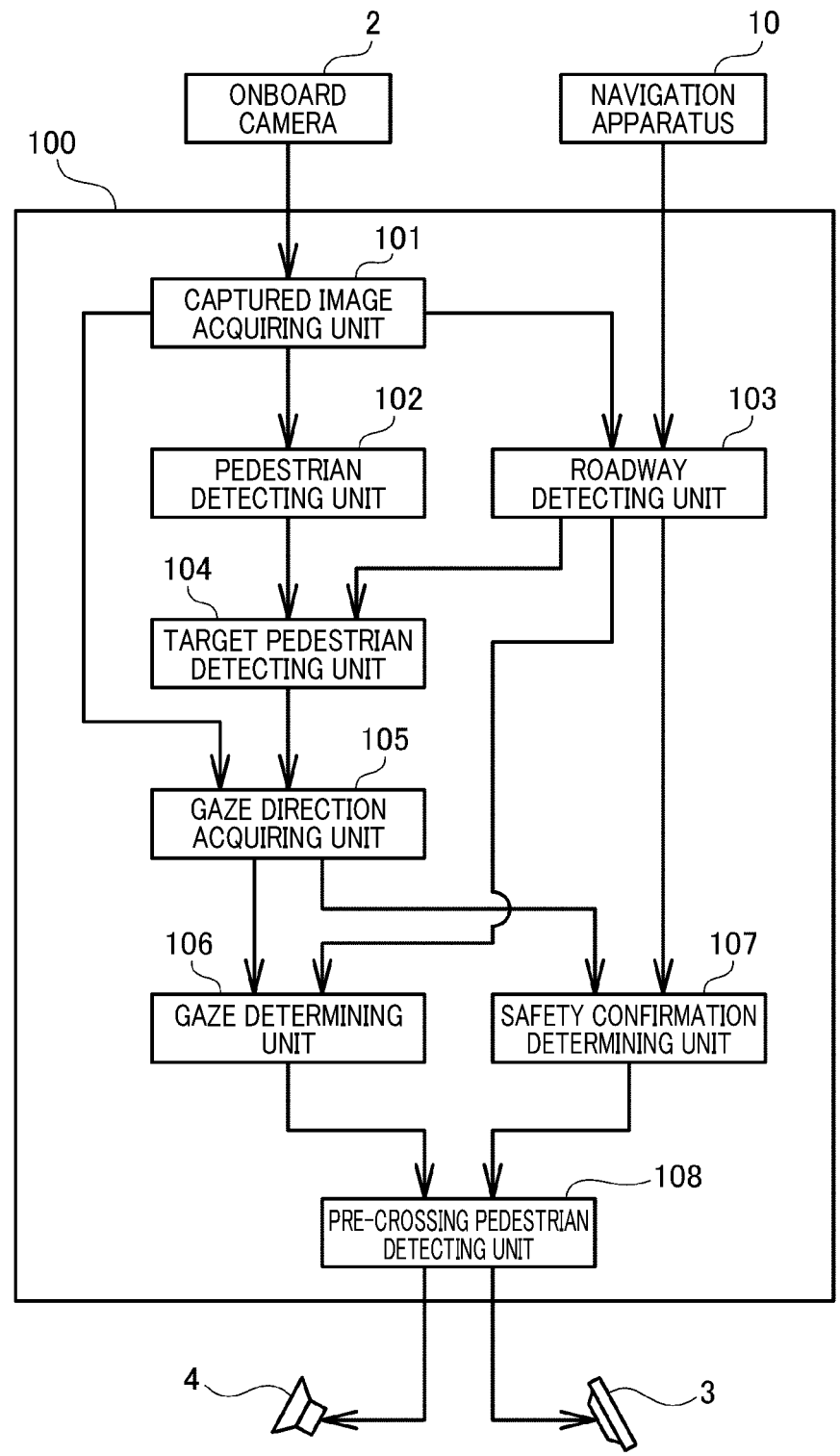
FIG. 2 is a block diagram of an internal configuration of the pedestrian detection apparatus 100 according to the present embodiment.

FIG. 2 shows an internal configuration of the pedestrian detection apparatus 100 according to the present embodiment. As shown in FIG. 2, the pedestrian detection apparatus 100 includes a captured image acquiring unit 101, a pedestrian detecting unit 102, a roadway detecting unit 103, a target pedestrian detecting unit 104, a gaze direction acquiring unit 105, a gaze determining unit 106, a safety confirmation determining unit 107, and a pre-crossing pedestrian detecting unit 108.

Here, these "units" are abstract concepts into which the-internal components of the pedestrian detection apparatus 100 are classified for convenience, with focus on functions that are provided for the detection of a pre-crossing pedestrian among pedestrians in a captured image. Therefore, this does not indicate that the pedestrian detection apparatus 100 is physically divided into these "units." These "units" can be actualized as a computer program that is run by a central processing unit (CPU). Alternatively, these "units" can be actualized as an electronic circuit including large-scale integration (LSI) and a memory. Still alternatively, these "units" can be actualized through a combination of the foregoing.

The captured image acquiring unit 101 is connected to the onboard camera 2. The captured image acquiring unit 101 acquires a captured image in which the onboard camera 2 has captured ahead of the vehicle 1 at a fixed time cycle, and outputs the captured image to the pedestrian detecting unit 102 and the roadway detecting unit 103.

The pedestrian detecting unit 102 analyzes the captured image received from the captured image acquiring unit 101 and thereby detects a pedestrian that appears in the captured image. As a method for detecting a pedestrian that appears in the captured image, various known methods, such as detection of a portion in the image that has the features of a pedestrian, can be used.

The roadway detecting unit 103 analyzes the captured image received from the captured image acquiring unit 101 and thereby detects a roadway that appears in the captured image. White lines are drawn on both sides of a roadway. Therefore, a roadway can be detected by the white lines being detected in the captured image. In addition, the navi apparatus 10 detects the current position of the vehicle 1 and also stores therein the map information including positional information regarding roadways. Therefore, when detecting a roadway in the captured image, the roadway detecting unit 103 may acquire the current position of the vehicle 1 and the map information from the navi apparatus 10, and detect the roadway using these pieces of information as well.

The target pedestrian detecting unit 103 detects a target pedestrian based on the detection results regarding pedestrians acquired from the pedestrian detecting unit 102 and the detection results regarding roadways acquired from the roadway detecting unit 103. Here, the target pedestrian refers to a pedestrian that is to be subjected to a determination regarding whether or not the pedestrian is a pre-crossing pedestrian, among the pedestrians detected by the pedestrian detecting unit 102. For example, when a pedestrian is present in a position that is sufficiently far from the roadway, it is obvious that the pedestrian is not attempting to cross the roadway, even without determination. Conversely, regarding a pedestrian who is present within a fixed distance from the roadway, whether or not the pedestrian is a pre-crossing pedestrian may be determined. Therefore, the target pedestrian detecting unit 104 detects a pedestrian (that is, a target pedestrian) to be subjected to the determination regarding whether the pedestrian is a pre-crossing pedestrian, among the pedestrians detected by the pedestrian detecting unit 102, based on the information on the position of the roadway detected by the roadway detecting unit 103.

The gaze direction acquiring unit 105 acquires a gaze direction of the target pedestrian detected by the target pedestrian detecting unit 104. According to the present embodiment, regarding the gaze direction of the target pedestrian, the gaze direction is acquired by the captured image acquired by the captured image acquiring unit 101 being analyzed and an orientation of a face of the target pedestrian being detected. Of course, the pedestrian may wear a dedicated apparatus that detects and wirelessly transmits the gaze orientation, and the gaze orientation wirelessly transmitted from the pedestrian may be acquired. Alternatively, a monitoring camera and an analysis apparatus may be set on the side of the road. The gaze orientation acquired through analysis of an image of the pedestrian may be wirelessly transmitted, and the wirelessly transmitted gaze orientation may be acquired.

The gaze determining unit 106 determines whether or not the target pedestrian has gazed at a crossing destination that is present on the other side of the roadway, based on the gaze orientation of the target pedestrian and the information on the position of the roadway.

In addition, the safety confirmation determining unit 107 determines whether or not the target pedestrian has performed safety confirmation regarding vehicles traveling on the roadway, based on the gaze orientation of the target pedestrian and the information on the position of the roadway. A method for determining whether or not the target pedestrian has gazed at the crossing destination or whether or not the target pedestrian has performed the safety confirmation will be described in detail hereafter.

In addition, when the target pedestrian has performed an action of gazing at the crossing destination and an action of the safety confirmation regarding vehicles within a predetermined amount of time, the pre-crossing pedestrian detecting unit 108 detects the target pedestrian as a pre-crossing pedestrian. Although details will be described hereafter, based on new knowledge discovered by the inventors of the present application, it is known that a pedestrian who is attempting to cross a roadway performs the action of gazing at the crossing destination and the action of the safety confirmation regarding vehicles before crossing. Therefore, if a target pedestrian who has performed these two actions within a predetermined amount of time is detected as the pre-crossing pedestrian, a pedestrian who is attempting to cross the roadway can be accurately detected at a stage before the pedestrian starts crossing. The pre-crossing pedestrian detecting unit 108 outputs the result of the detection of the pre-crossing pedestrian performed in such a manner using the monitor 3 or the speaker 4.

B. Pre-Crossing Pedestrian Detection Process

Figure 3:
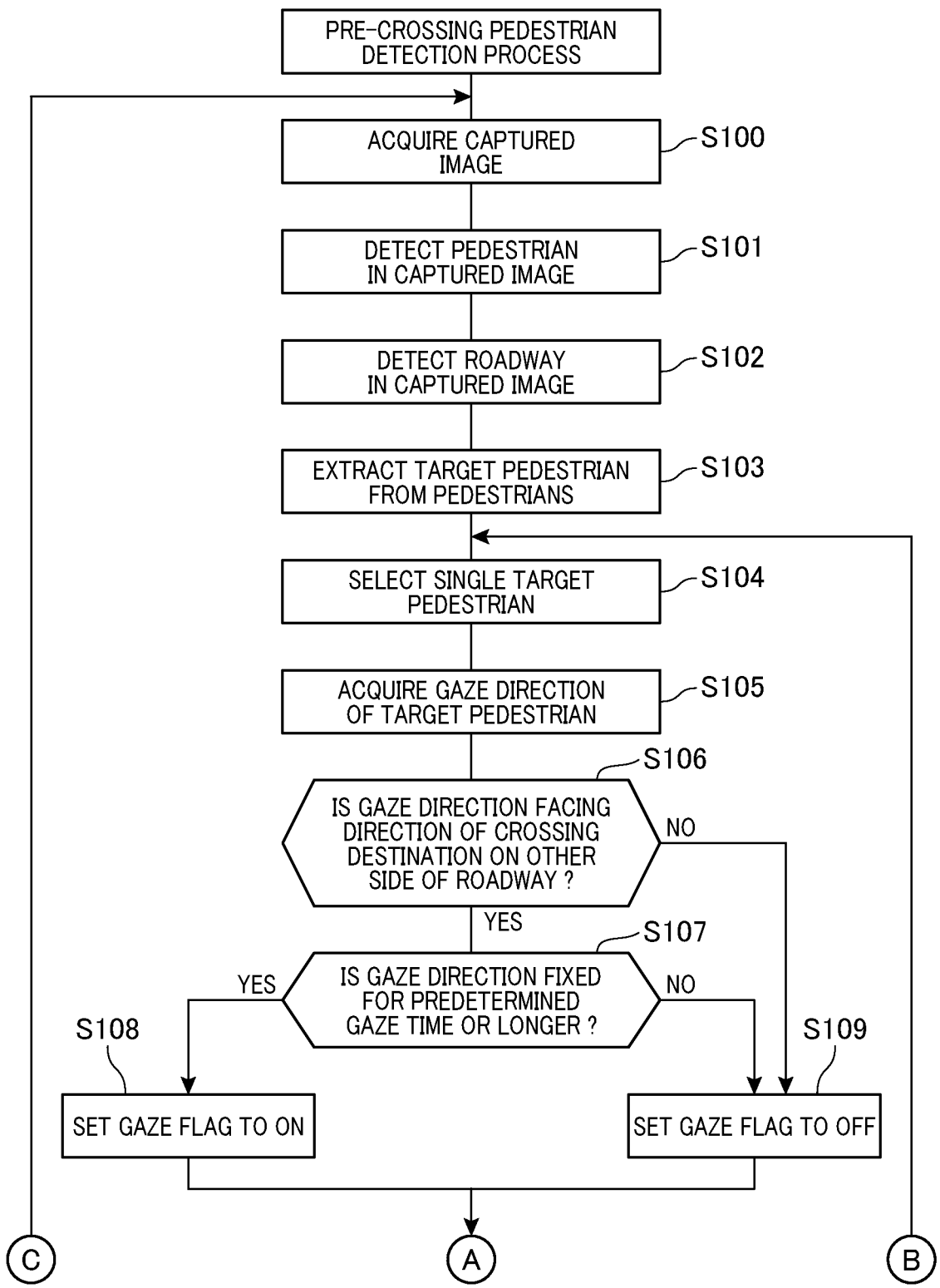
FIG. 3 is a flowchart of a first-half part of a pre-crossing pedestrian detection process performed by the pedestrian detection apparatus 100 according to the present embodiment to detect a pedestrian who is attempting to cross a roadway.
Figure 4:
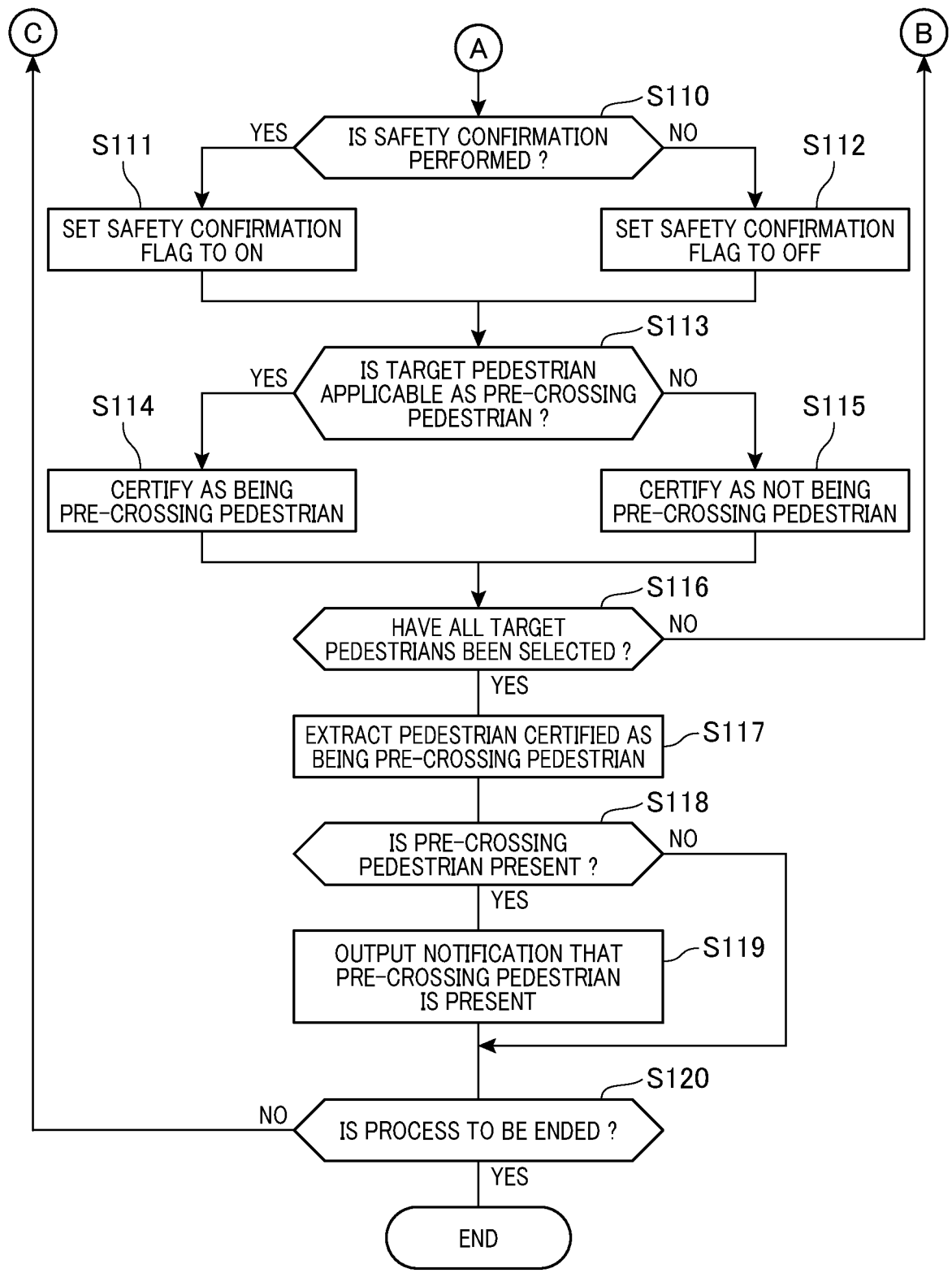
FIG. 4 is a flowchart of a second-half part of the pre-crossing pedestrian detection process.

FIG. 3 and FIG. 4 show detailed flowcharts of a process in which the pedestrian detection apparatus 100 according to the present embodiment detects the pre-crossing pedestrian.

As shown in FIG. 3 and FIG. 4, in a pre-crossing pedestrian detection process, first, the captured image captured by the onboard camera 2 is acquired (S100). Then, a pedestrian in the captured image is detected through analysis of the acquired captured image (S101). Furthermore, a roadway is detected in the captured image (S102). As described above, a pedestrian in the captured image can be detected through retrieval of a portion in the captured image that has the features of a pedestrian. In addition, a roadway in the captured image can be detected through extraction of a portion in which the white lines present on both sides of the roadway, a stepped portion on a road shoulder, or the like appears.

Then, the target pedestrian is extracted from the pedestrians (S103). As described above, the target pedestrian is a pedestrian who is to be subjected to the determination regarding whether or not the pedestrian is a pre-crossing pedestrian. The method for extracting the target pedestrian will be described using a specific example.

Figure 5:
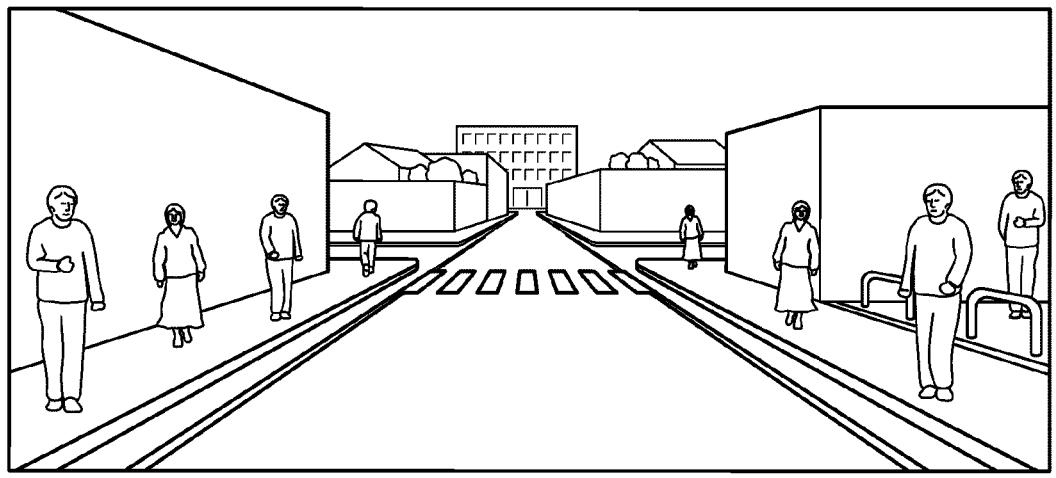
FIG. 5 is an explanatory diagram of an example of a captured image acquired by an onboard camera 2.

For example, when the captured image is an image shown in an example in FIG. 5, the pedestrians in the captured image are detected. In image 6a in FIG. 6, an aspect in which eight pedestrians, pedestrians A to H, are detected from the captured image is shown. Next, the roadway in the captured image is detected. In image 6b in FIG. 6, the roadway detected from the captured image is displayed with hatching added thereto.

In addition, because the onboard camera 2 is fixed to the vehicle 1, the positions of the pedestrians A to H and the roadway in the captured image can be replaced with relative positions with reference to the vehicle 1 in actual space. Therefore, among the pedestrians A to H shown in image 6a in FIG. 6, the pedestrians of which the distance to the roadway is within a predetermined distance are extracted as the target pedestrians. A reason for this is that, because a pedestrian who is in a position that is sufficiently far from the roadway cannot be considered to be attempting to cross the roadway, it is considered sufficient to merely extract the pedestrians who are near the roadway as the target pedestrians.

Figure 6:
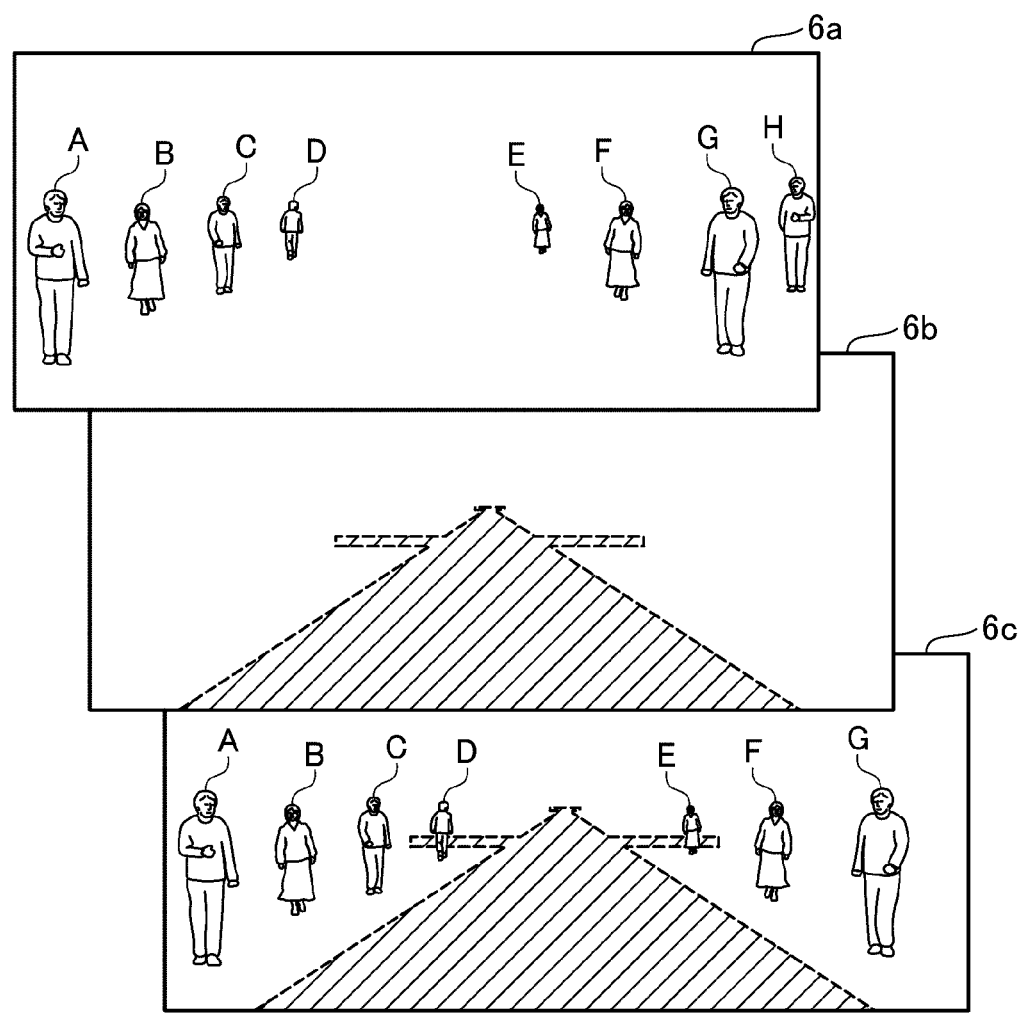
FIG. 6 is an explanatory diagram of a method for extracting a target pedestrian from the captured image.

As a result, as shown in image 6c in FIG. 6, the seven pedestrians A to G, excluding the pedestrian H, are extracted as the target pedestrians from the eight pedestrians A to H in the captured image.

Here, for example, a situation in which a pedestrian crossing the roadway is impossible, such as due to a fence being provided in the center of the roadway, may also occur. Alternatively, a situation in which a pedestrian crossing the roadway is impossible due to reasons such as a sidewalk being present on one side of the roadway but a sidewalk not being present on the opposite side, may also occur. Therefore, in cases in which the captured image is analyzed and such a situation is detected, the pedestrians who are in such a situation may be excluded and other pedestrians may be extracted as the target pedestrians.

Alternatively, a range of road over which crossing of the roadway by a pedestrian is impossible is stored in the map information in the navi apparatus 10. Then, a pedestrian who is present within such a range of road may be excluded even if the pedestrian is a pedestrian who is within the predetermined distance from the roadway, and other pedestrians may be extracted as the target pedestrians.

When the target pedestrian is extracted from the pedestrians in the captured image in the manner above (S103 in FIG. 3), a single target pedestrian is selected (S104). The gaze direction of the target pedestrian is acquired (S105). According to the present embodiment, the gaze direction is acquired by an image of a head portion of the target pedestrian in the captured image being analyzed and the orientation of the face being detected.

Of course, the gaze direction may also be acquired by the gaze orientation of the pedestrian being detected through use of a monitoring camera and an analysis apparatus set on a road shoulder and the wirelessly transmitted detection result being received. Alternatively, the gaze orientation may be detected by the pedestrian wearing a dedicated apparatus, and the gaze direction of the pedestrian may be received by the detection result being wirelessly transmitted.

Next, whether or not the gaze direction of the target pedestrian faces the direction of the crossing destination that is present on the other side of the roadway is determined (S106). As described above, the target pedestrian is a pedestrian who is present in an area of which the distance to the roadway is within the predetermined distance. Therefore, the roadway is present near the target pedestrian. Thus, whether or not the target pedestrian is looking towards the other side of the roadway is determined.

Figure 7B:
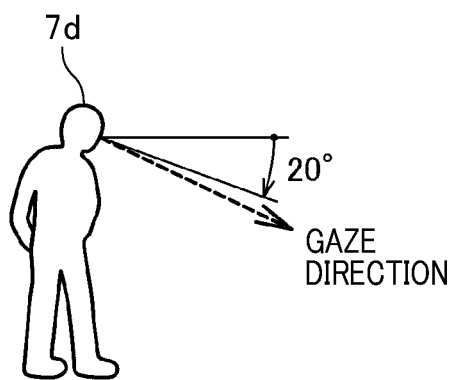
FIG. 7B is an explanatory diagram of a method for determining whether or not the target pedestrian is gazing at a crossing destination.
Figure 7C:
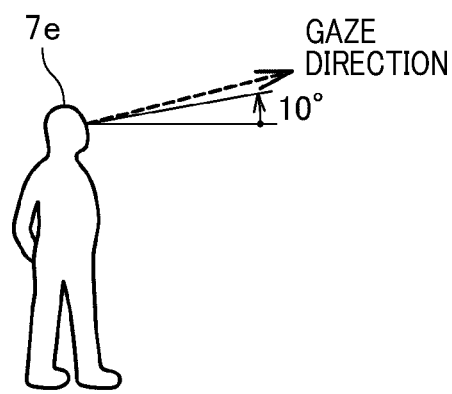
FIG. 7C is an explanatory diagram of a method for determining whether or not the target pedestrian is gazing at a crossing destination.

FIG. 7A to FIG. 7C show a method for determining whether or not the gaze direction of the target pedestrian is facing the direction of the crossing destination. For example, as shown in FIG. 7A, when the gaze direction (the orientation of the face, according to the present embodiment) of a target pedestrian 7a is orthogonal to the roadway in a state in which the roadway crosses directly in front of the body of the target pedestrian 7a, the gaze direction of the target pedestrian 7a can be determined to be facing the direction of the crossing destination.

In addition, as shown in the example in FIG. 7A, in cases in which the orientation of the body of a target pedestrian 7b is significantly slanted in relation to the roadway as well, when the gaze direction of the target pedestrian 7b is within a range of −45 degrees to +45 degrees in relation to the direction orthogonal to the roadway, the gaze direction of the target pedestrian 7b can be determined to be facing the direction of the crossing destination.

In contrast, as shown in the example in FIG. 7A, even in cases in which the orientation of the body of a target pedestrian 7c is not slanted in relation to the roadway, when the gaze direction of the target pedestrian 7b is not within the range of −45 degrees to +45 degrees in relation to the direction orthogonal to the roadway, the gaze direction of the target pedestrian 7c can be determined to not be facing the direction of the crossing destination.

In addition, as shown in an example in FIG. 7B, when a gaze direction of a target pedestrian 7d is tilted downward from a horizontal direction at an angle greater than a predetermined angle (such as 20 degrees), the gaze direction of the target pedestrian 7d can be determined to not be facing the direction of the crossing destination.

Alternatively, as shown in an example in FIG. 7C, when a gaze direction of a target pedestrian 7e is tilted upward from the horizontal direction at an angle greater than a predetermined angle (such as 10 degrees), the gaze direction of the target pedestrian 7e can be determined to not be facing the direction of the crossing destination.

At S106 in FIG. 3, whether or not the gaze direction of the target pedestrian is facing the direction of the crossing destination present on the other side of the roadway is determined in the manner above.

When the gaze direction is determined to be facing the direction of the crossing destination as a result (yes at S106), next, whether or not the gaze direction is fixed at this direction for a predetermined gaze time (such as 100 milliseconds or longer) or longer is determined (S107). Then, when the gaze direction is determined to be fixed for the gaze time or longer (yes at S107), a gaze flag for the target pedestrian selected at S104 is set to ON (S108). Here, the gaze flag is a flag that indicates that the target pedestrian has gazed at the crossing destination present on the other side of the roadway. In addition, the gaze flag is set for each target pedestrian (in the example shown in FIG. 6, for each of the pedestrians A to G). It is known that, in general, the gaze is fixed for a predetermined amount of time or longer (such as 100 milliseconds or longer) when a person gazes at something. Therefore, if the gaze direction of the target pedestrian is fixed at the direction of the crossing destination present on the other side of the roadway for the predetermined gaze time or longer, it can be considered that the target pedestrian has gazed at the crossing destination. Therefore, in such cases, the gaze flag of the selected target pedestrian is set to ON.

In contrast, when the gaze direction is facing the direction of the crossing destination (yes at S106) but the gaze time is determined to have not yet elapsed from when the gaze direction faces the direction (no at S107), the gaze flag for the selected target pedestrian is set to OFF (S109).

In addition, when the gaze direction is not facing the direction of the crossing destination in the first place (no at S106), the gaze flag for the selected target pedestrian is set to OFF without whether or not the gaze direction is fixed for the gaze time or longer being determined (S109).

Next, the pedestrian detection apparatus 100 according to the present embodiment determines whether or not the target pedestrian has performed the safety confirmation regarding vehicles traveling on the roadway (S110 in FIG. 4). That is, because the roadway is present near the target pedestrian as described above, whether or not the target pedestrian has performed the safety confirmation regarding vehicles traveling on this roadway is determined. Whether or not the target pedestrian has performed the safety confirmation is determined in the following manner, based on the gaze direction of the target pedestrian.

Figure 8:
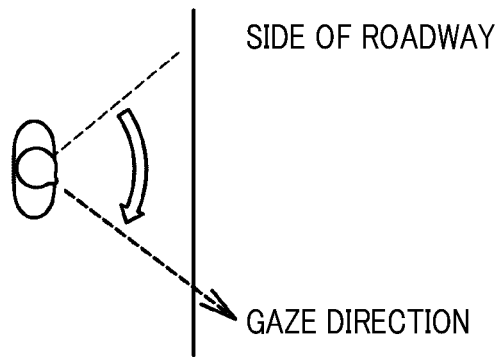
FIG. 8 is an explanatory diagram of an aspect of a safety confirmation action performed by the target pedestrian.

For example, as shown in FIG. 8, when a characteristic movement in which the gaze direction of the target pedestrian moves in one direction along a side of the roadway in relation to the target pedestrian over a predetermined angle or greater within a predetermined movement speed range is made, the target pedestrian is determined to have performed the safety confirmation.

A reason for this is that, because such a characteristic gaze movement occurs when a vehicle that is traveling on a roadway is tracked by the eyes, if such a gaze movement is made, the safety confirmation regarding vehicles traveling on the roadway can be considered to be performed.

Figure 9:
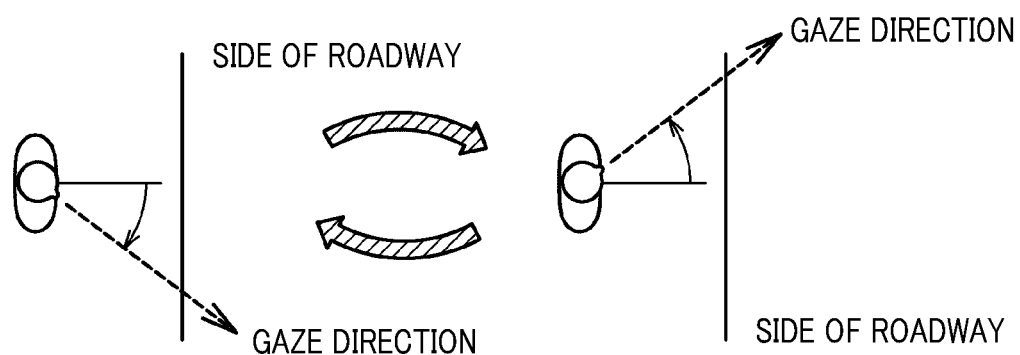
FIG. 9 is an explanatory diagram of another aspect of a safety confirmation action performed by the target pedestrian.

In addition, as shown in an example in FIG. 9, when a characteristic movement in which the gaze direction of the target pedestrian is fixed at one direction of either of left and right when facing the roadway for the predetermined confirmation time or longer and thereafter is fixed at the other direction as well for the predetermined confirmation time or longer is made, the target pedestrian is determined to have performed the safety confirmation. Alternatively, in cases in which such a gaze movement is repeated as well, the target pedestrian is determined to have performed the safety confirmation.

A reason for this is that, because such a characteristic gaze movement occurs when a pedestrian is confirming safety on the left and right, if such a gaze movement is made, the safety confirmation regarding vehicles traveling on the roadway can be considered to be performed.

Here, the predetermined confirmation time used to determine whether or not the pedestrian has confirmed safety on the left and right can be set to the same amount of time as the above-described gaze time (such as an amount of time that is 100 milliseconds or longer). In addition, confirmation that the one direction and the other direction of the left and right are separated by an angle that is equal to or greater than a predetermined confirmation angle (typically 90 degrees) is preferably performed.

Figure 10:
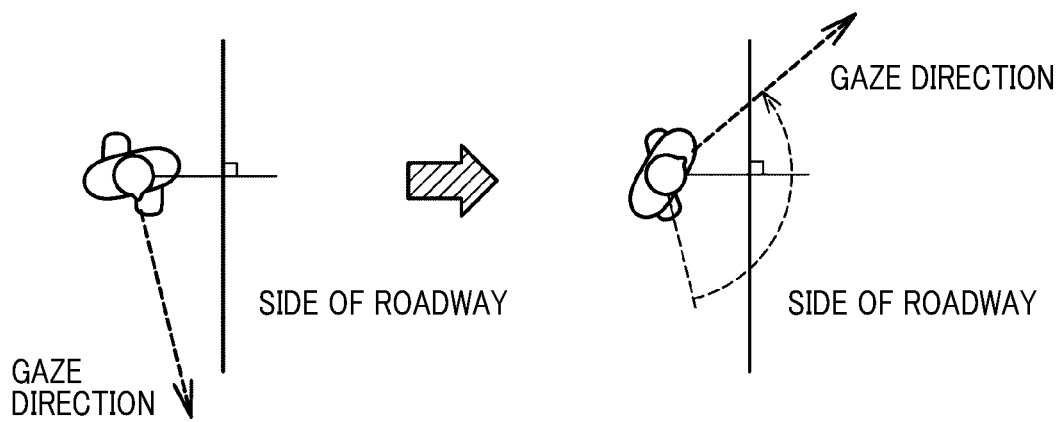
FIG. 10 is an explanatory diagram of still another aspect of a safety confirmation action performed by the target pedestrian.

Furthermore, as shown in an example in FIG. 10, when a characteristic movement in which the gaze direction of the target pedestrian moves from a state facing the direction along the roadway beyond a state orthogonal to the roadway is made, the target pedestrian is determined to have performed the safety confirmation.

A reason for this is that, because such a characteristic gaze movement occurs when a pedestrian is confirming safety behind the pedestrian, if such a gaze movement is made, the safety confirmation regarding vehicles traveling on the roadway can be considered to be performed. Here, confirmation that the gaze direction before such a gaze movement is made and the gaze direction after movement beyond the state orthogonal to the roadway are separated by an angle that is equal to or greater than a predetermined look-back angle (typically 120 degrees) is preferably performed.

At S110 in FIG. 4, whether or not the target pedestrian has performed the safety confirmation regarding vehicles traveling on the roadway is determined based on the gaze direction of the target pedestrian by a method such as that above.

When the target pedestrian is determined to have performed the safety confirmation as a result, a safety confirmation flag for the selected target pedestrian (that is, the target pedestrian selected at S104 in FIG. 3) is set to ON (S111). Here, the safety confirmation flag is a flag that indicates that the target pedestrian has performed the safety confirmation regarding vehicles traveling on the roadway. In a manner similar to the above-described gaze flag, the safety confirmation flag is also set for each target pedestrian.

In contrast, when the target pedestrian is determined to not have performed the safety confirmation, the safety confirmation flag for the selected target pedestrian is set to OFF (S112).

When the gaze flag and the safety conformation flag for the selected target pedestrian are set in this manner, whether or not the target pedestrian is applicable as the pre-crossing pedestrian is determined based on the histories of the gaze flag and the safety confirmation flag set up to this point (S113). A method for determining whether or not the target pedestrian is applicable as the pre-crossing pedestrian will be described hereafter. Here, as described above, the pre-crossing pedestrian refers to a pedestrian who has an intention to cross the roadway but has not yet actually started crossing.

When the target pedestrian is determined to be applicable as the pre-crossing pedestrian as a result (yes at S113), the selected target pedestrian is certified as being the pre-crossing pedestrian (S114). In contrast, when the target pedestrian is determined to not be applicable as the pre-crossing pedestrian (no at S113), the selected target pedestrian is certified as not being the pre-crossing pedestrian (S115).

When whether or not the selected target pedestrian is applicable as the pre-crossing pedestrian is determined in the manner above (S114, S115), whether or not all target pedestrians have been selected is determined (S116). That is, at S104 in FIG. 3, a single pedestrian is selected from the target pedestrians extracted at step S103. At subsequent S105 to S115 in FIG. 4, the above-described series of processes is performed for this pedestrian. Therefore, when the processes for the selected single target pedestrian is completed, at S116, whether or not a target pedestrian for which the processes have not yet been completed (that is, a target pedestrian who has not been selected) is present is determined.

When a target pedestrian who has not yet been selected is present as a result (no at S116), the pedestrian detection apparatus returns to S104 in FIG. 3. After a new target pedestrian is selected, the above-described subsequent series of processes (S105 to S115 in FIG. 4) is performed for the selected target pedestrian.

As such an operation is repeated, a determination that all target pedestrians have been selected is eventually made (yes at S116). Then, in this case, the pedestrian who has been certified as being the pre-crossing pedestrian is extracted (S117).

Here, the method by which the pedestrian detection apparatus 100 according to the present embodiment determines whether or not the target pedestrian is applicable as the pre-crossing pedestrian in the process at S113 will be described.

Figure 11A:
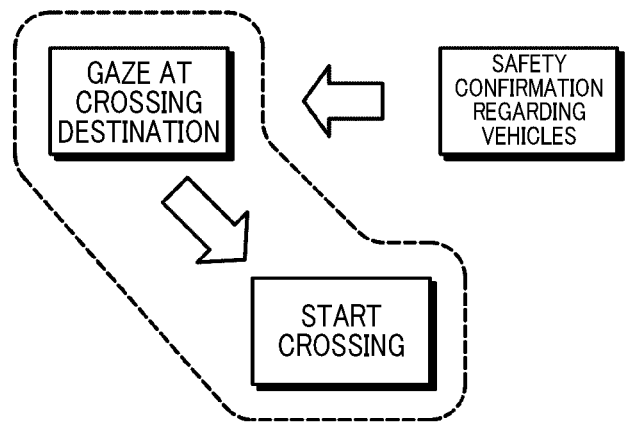
FIG. 11A is an explanatory diagram of a basic idea for extracting a pre-crossing pedestrian from the target pedestrians.
Figure 11B:
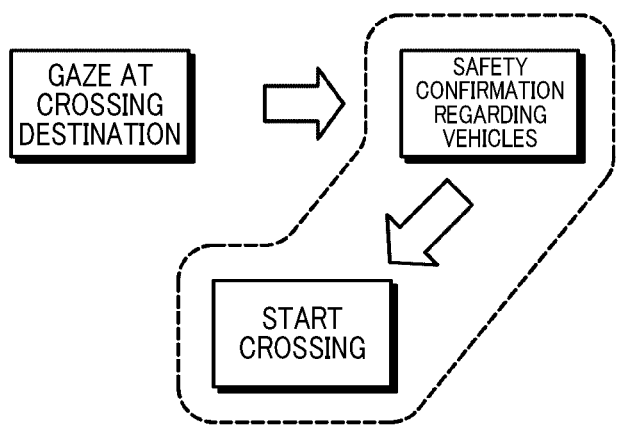
FIG. 11B is an explanatory diagram of the basic idea for extracting a pre-crossing pedestrian from the target pedestrians.
Figure 11C:
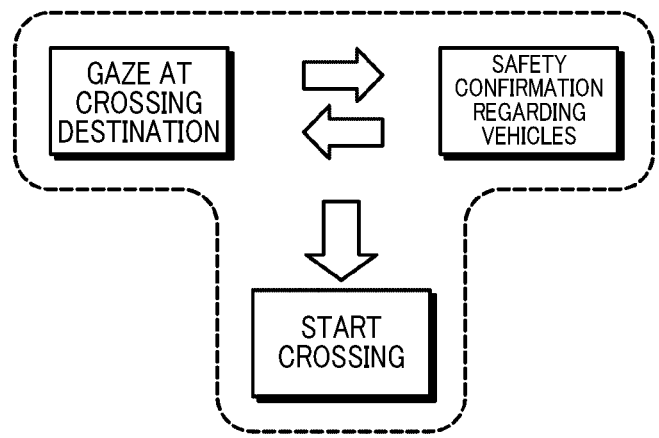
FIG. 11C is an explanatory diagram of the basic idea for extracting a pre-crossing pedestrian from target pedestrians.

FIG. 11A to FIG. 11C show a basic idea for determining whether or not a target pedestrian is applicable as the pre-crossing pedestrian. First, there are cases in which the pedestrian who is crossing the roadway gazes at the crossing destination immediately before starting to cross and cases in which the pedestrian who is crossing the roadway performs the safety confirmation regarding vehicles traveling on the roadway immediately before starting to cross. Here, based on knowledge newly discovered by the inventors of the present application, even in cases in which the pedestrian gazes at the crossing destination immediately before starting to cross, it is not that the pedestrian crosses without performing the safety confirmation regarding vehicles, but rather that the pedestrian performs the safety confirmation before gazing at the crossing destination (see FIG. 11A).

A similar idea also applies to cases in which the pedestrian performs the safety confirmation immediately before starting to cross. That is, when the pedestrian performs the safety confirmation immediately before starting to cross, it is not that the pedestrian crosses without gazing at the crossing destination, but rather than the pedestrian gazes at the crossing destination before performing the safety confirmation regarding vehicles (see FIG. 11B).

Therefore, the movements before the start of crossing were observed regarding over a hundred pedestrians who actually crossed a roadway at more than ten various locations. As a result, it has been confirmed that pedestrians who crossed the roadway performed the movement of gazing at the crossing destination and the safety confirmation regarding vehicles immediately before crossing with a probability of nearly 100%.

Based on the foregoing, an attempt to cross the roadway can be considered to be made when the two movements, that is, the movement of gazing at the crossing destination and the movement of performing the safety confirmation regarding vehicles are performed within a predetermined retrospection time (such as 3 seconds) (see FIG. 11C). In addition, even when the attempt to cross the roadway is made, the crossing may be stopped. Therefore, even when the two movements are performed within a predetermined amount of time, after a subsequent elapse of a fixed amount of time (such as 5 seconds), the crossing of the roadway may be considered to be stopped.

The pedestrian detection apparatus 100 according to the present embodiment determines whether or not a target pedestrian is applicable as the pre-crossing pedestrian based on an idea such as that above.

Figure 12A:
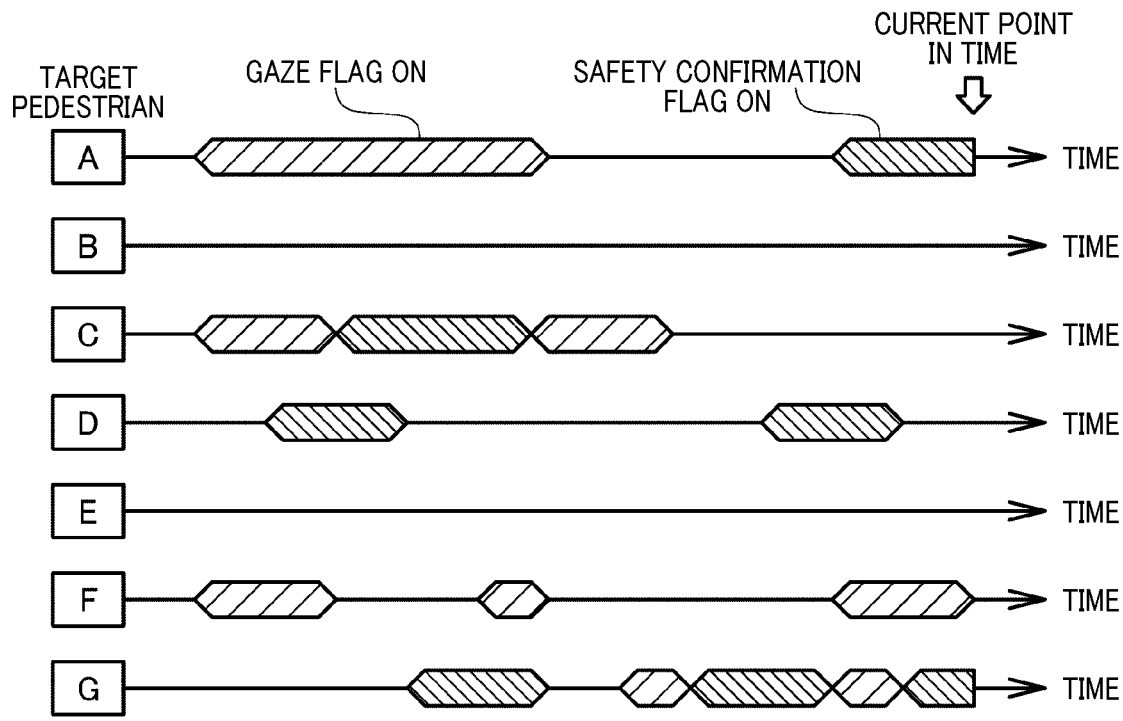
FIG. 12A is an explanatory diagram of a method for extracting a pre-crossing pedestrian from the target pedestrians.
Figure 12B:
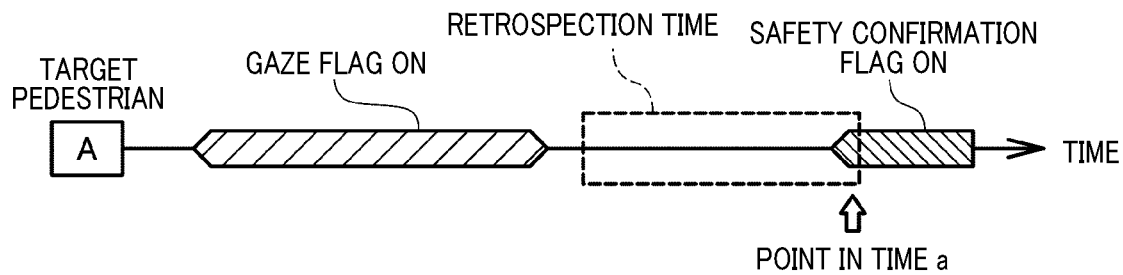
FIG. 12B is an explanatory diagram of the method for extracting a pre-crossing pedestrian from the target pedestrians.
Figure 12C:
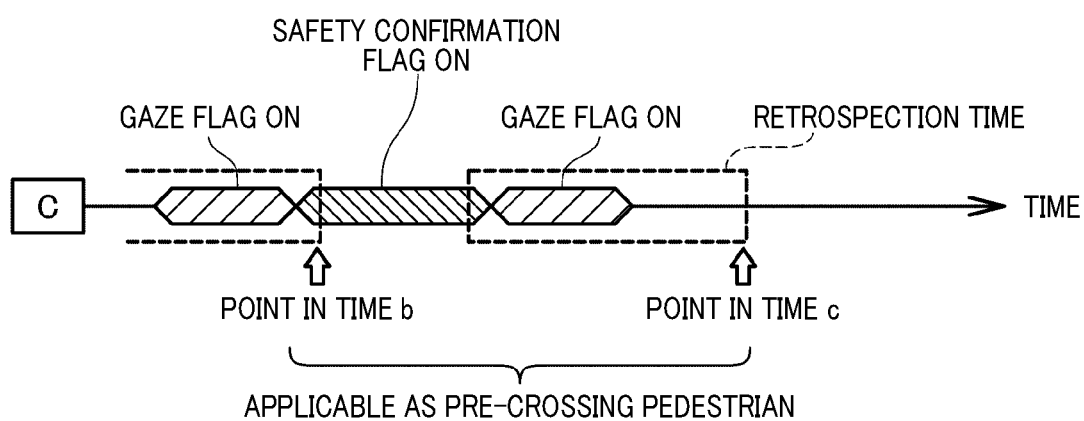
FIG. 12C is an explanatory diagram of the method for extracting a pre-crossing pedestrian from target pedestrians.

FIG. 12A to FIG. 12C are explanatory diagrams of a method for determining whether or not a target pedestrian is applicable as the pre-crossing pedestrian. As mentioned at S113 in FIG. 4, whether or not a target pedestrian is applicable as the pre-crossing pedestrian is determined based on the histories of the gaze flag and the safety confirmation flag set up to this point.

FIG. 12A conceptually shows the manner in which the settings of the gaze flag and the safety confirmation flag changes with the passage of time for each of the target pedestrians A to G shown in the example in FIG. 6. A black straight line that extends from the left side towards the right side in FIG. 12A indicates that neither the gaze flag nor the safety confirmation flag is set (that is, both flags are set to OFF). A portion with rough hatching indicates that the gaze flag is set to ON. A portion with fine hatching indicates that the safety confirmation flag is set to ON.

For example, regarding the pedestrian A, after the gaze flag is set to ON for a brief period, a state in which both flags are set to OFF continues. Subsequently, the safety confirmation flag is set to ON and this state continues to a current point in time.

In addition, regarding the pedestrian B, neither the gaze flag nor the safety confirmation flag is set to ON. Furthermore, regarding the pedestrian C, after the gaze flag is set to ON, the safety confirmation flag is immediately set to ON. After the gaze flag is set to ON again, a state in which neither the gaze flag nor the safety confirmation flag is set to ON is entered, and this state continues to the current point in time.

Here, as described above, the gaze flag is a flag that indicates that the crossing destination has been gazed upon. The safety confirmation flag is a flag that indicates that the safety confirmation regarding vehicles traveling on the roadway has been performed. Because gazing at the crossing destination and the safety confirmation regarding vehicles cannot be simultaneously performed, the gaze flag and the safety confirmation flag are not simultaneously set to ON.

If the histories of the gaze flag and the safety confirmation flag for each target pedestrian (see FIG. 12A) are detected in this manner, whether or not the target pedestrian is attempting to cross the roadway, that is, is applicable as the pre-crossing pedestrian can be determined.

For example, regarding the target pedestrian A, the safety confirmation flag is set to ON after the elapse of a brief period after the gaze flag is set to ON. Therefore, as shown in FIG. 12B, it is determined whether or not the gaze flag is set to ON during a period going back the predetermined retrospection time (such as 3 seconds) at a point in time a at which the safety confirmation flag is set to ON. As shown in FIG. 12B, regarding the pedestrian A, the gaze flag is not set to ON within the retrospection time going back from the point in time a. Therefore, because, after either of the safety confirmation flag and the gaze flag is set to ON, the other flag is not set to ON within the retrospection time, the pedestrian A is determined to not be applicable as the pre-crossing pedestrian.

In addition, regarding the pedestrian C, the safety confirmation flag is set to ON immediately after the gaze flag is set to ON. Therefore, as shown in FIG. 12C, the gaze flag is set to ON within the retrospection time going back from a point in time b at which the safety confirmation flag is set to ON. Consequently, the pedestrian C is determined to be applicable as the pre-crossing pedestrian.

Furthermore, regarding the pedestrian C, even at a point in time after the point in time b, the gaze flag is set to ON within the period going back the retrospection time while the safety confirmation flag is set to ON. Therefore, the pedestrian C is continuously determined to be applicable as the pre-crossing pedestrian even after the point in time b. Still further, after the safety confirmation flag is set to OFF and the gaze flag is set to ON for the second time, the gaze flag is set to ON during the period going back the retrospection time from the point in time at which the second gaze flag is set to ON. Therefore, the target pedestrian C is continuously determined to be applicable as the pre-crossing pedestrian. In addition, even after the second gaze flag is set to OFF, a state in which the gaze flag is set to ON during the period going back the retrospection time and a state in which the confirmation flag is set to ON are present until a point in time c. Therefore, the target pedestrian C is continuously determined to be applicable as the pre-crossing pedestrian until the point in time c.

At S113 in FIG. 4, regarding the selected target pedestrian (that is, the pedestrian selected at S104 in FIG. 3), whether or not the target pedestrian is applicable as the pre-crossing pedestrian is determined by a method such as that above. When the selected target pedestrian is determined to be applicable as the pre-crossing pedestrian as a result (yes at S113), the selected target pedestrian is certified as being the pre-crossing pedestrian and this certification is stored (S114). In contrast, when the selected target pedestrian is determined to not be applicable as the pre-crossing pedestrian (no at S113), the selected target pedestrian is certified as not being the pre-crossing pedestrian, and this certification is stored (S115).

Subsequently, as described above, whether or not all target pedestrians have been selected is determined (S116). When all target pedestrians are determined have been selected (yes at S116), the pedestrian that has been certified as being the pre-crossing pedestrian is extracted (S117).

Then, whether or not the extracted pre-crossing pedestrian is present is determined (S118). When the pre-crossing pedestrian is present (yes at S118), a notification that the pre-crossing pedestrian is present is outputted using the monitor 3 and the speaker 4 provided in a vehicle cabin (S119).

Figure 13:
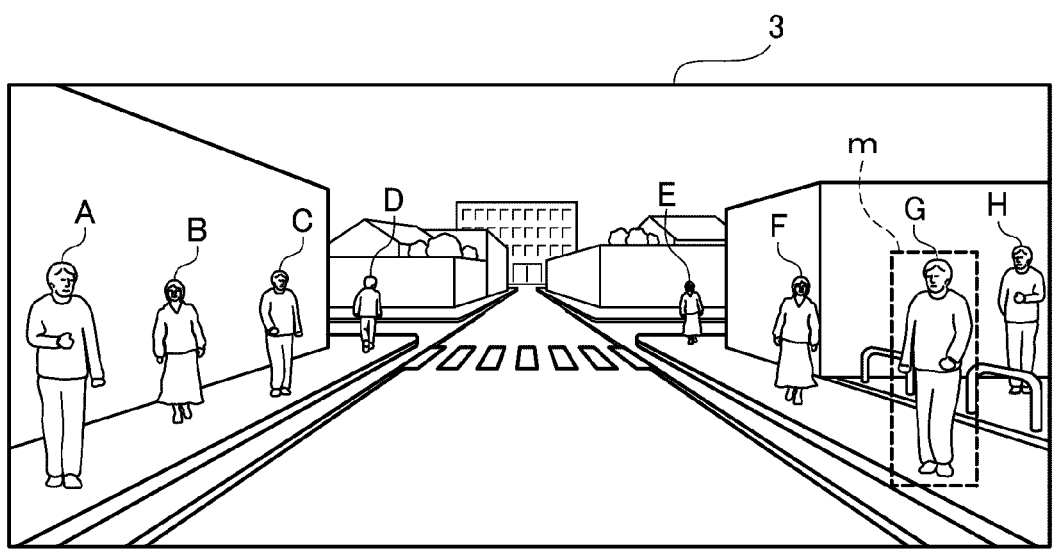
FIG. 13 is an explanatory diagram of an example of a manner in which an extraction result regarding a pre-crossing pedestrian is outputted.
Figure 13:

FIG. 13 shows an example of a manner in which the extraction result regarding the pre-crossing pedestrian is outputted onto a screen of the monitor 3. As shown in FIG. 13, the captured image in which the onboard camera 2 has captured ahead of the vehicle 1 is displayed on the screen of the monitor 3. As described above, the eight pedestrians A to H appear in the captured image. A marker image m that is indicated by a broken-line rectangle is displayed overlapping the pedestrian G who is extracted as the pre-crossing pedestrian among the pedestrians A to H. Therefore, the driver of the vehicle 1 immediately recognizes that, among the eight pedestrians A to H, the pedestrian to which particular attention needs to be paid is the pedestrian G.

In addition, in the pedestrian detection apparatus 100 according to the present embodiment, when the extracted pre-crossing pedestrian is present as a result of the pre-crossing pedestrian being extracted (yes at S118), an audio notification that the pre-crossing pedestrian is present (such as "a pedestrian is attempting to cross") is outputted from the speaker 4.

When the notification that the pre-crossing pedestrian is present is outputted in this manner (S119), whether or not to end the pre-crossing pedestrian detection process shown in FIG. 3 and FIG. 4 is determined (S120). When the process is not to be ended as a result (no at S120), after the captured image is acquired from the onboard camera 2 (S100 in FIG. 3), the above-described subsequent series of processes is started.

Meanwhile, at S117 in FIG. 4, when a pedestrian who is certified as being the pre-crossing pedestrian is not present as a result of the pedestrian who is certified as being the pre-crossing pedestrian being extracted (no at S118), whether or not to end the pre-crossing pedestrian detection process is determined (S120) without the notification that the pre-crossing pedestrian is present being outputted. When the process is not to be ended as a result (no at S120), the pedestrian detection apparatus 100 returns to the beginning of the process. After the captured image is acquired from the onboard camera 2 (S100 in FIG. 3), the above-described subsequent series of processes is started.

In addition, when the process is determined to be ended at S120 (yes at S120), the pre-crossing pedestrian detection process is ended.

In this manner, the pedestrian detection apparatus 100 according to the present embodiment can detect a pedestrian who is attempting to cross the roadway (that is, the pre-crossing pedestrian) at a stage before the pedestrian actually starts crossing. In addition, when the pre-crossing pedestrian is detected, as described above with reference to FIG. 11A to FIG. 11C, the detection is performed based on whether or not the pedestrian has performed the movement of gazing at the crossing destination and the movement of performing the safety confirmation regarding vehicles traveling on the roadway within a predetermined amount of time. Therefore, the pre-crossing pedestrian can be detected with high accuracy.

As a result, even in cases in which many pedestrians are present ahead of the vehicle 1, a pedestrian who is attempting to cross the roadway can be detected both with accuracy and at a stage before the pedestrian actually starts crossing. Therefore, the burden placed on the driver to monitor pedestrians can be significantly reduced.

For example, in the example shown in FIG. 13, the eight pedestrians A to H are present ahead of the vehicle 1. However, at this stage, because none of the pedestrians have yet to actually start crossing, determining which pedestrian is attempting to cross the roadway is difficult. However, in the pedestrian detection apparatus 10 according to the present embodiment, the driver can be notified that the pedestrian G is attempting to cross the roadway at a stage before the pedestrian G actually starts crossing the roadway. Therefore, the burden of monitoring that is placed on the driver can be significantly reduced.

In addition, in the pedestrian detection apparatus 100 according to the present embodiment, when the pre-crossing pedestrian is present, an audio notification thereof is outputted from the speaker 4 (see FIG. 13). Therefore, when the driver is driving while looking ahead in an ordinary manner, the driver can immediately recognize that the pre-crossing pedestrian has been extracted even without monitoring the monitor 3. If the driver then looks at the screen of the monitor 3, the driver can immediately recognize which pedestrian is the pre-crossing pedestrian by the marker image m.

C. Modification Examples

Several modification examples can be considered regarding the above-described present embodiment. These modification examples will be briefly described, mainly focusing on the differences from the present embodiment.

C-1. First Modification Example

In the above-described pedestrian detection apparatus 100 according to the present embodiment, when the gaze direction of the target pedestrian makes the characteristic movement shown in FIG. 8 (that is, the movement of moving in one direction along the side of the roadway in relation to the target pedestrian over a predetermined angle or greater within a predetermined movement speed range) the target pedestrian is presumed to have tracked a vehicle that is traveling on the roadway with their eyes and is determined to have performed the safety confirmation regarding vehicles.

However, the position of a vehicle that is traveling on the roadway may be detected, and whether or not the gaze direction of the target pedestrian is facing the direction of the vehicle may be determined. Then, when the gaze direction of the target pedestrian also moves in accompaniment with the position of the vehicle moving, the target pedestrian may be determined to have performed the safety confirmation regarding vehicles.

Figure 14:
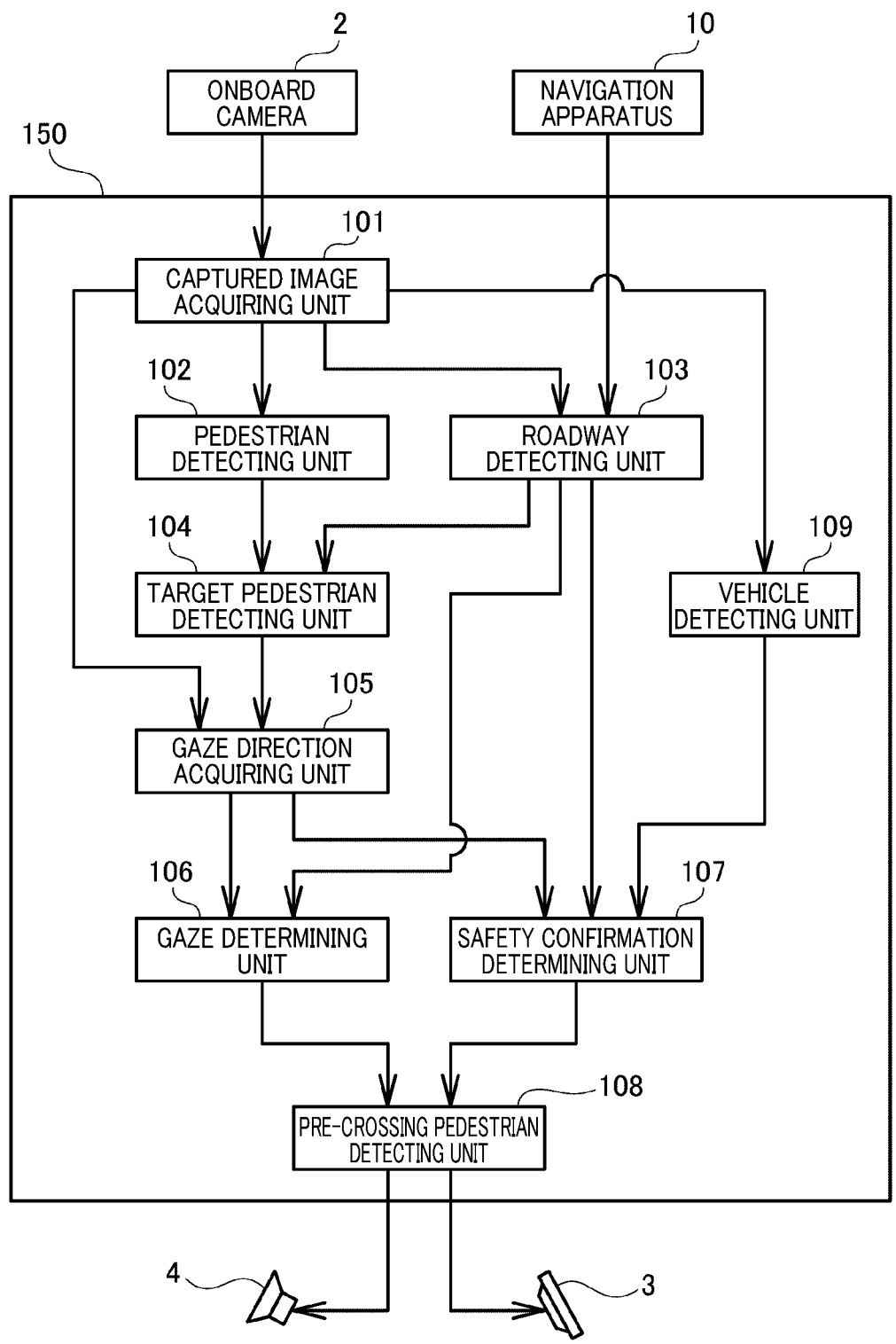
FIG. 14 is a block diagram of an internal configuration of a pedestrian detection apparatus 150 in a first modification example.

FIG. 14 shows an internal configuration of a pedestrian detection apparatus 150 in such a first modification example. In the pedestrian detection apparatus 150 of the first modification example shown in FIG. 14, a vehicle detecting unit 109 is added to the pedestrian detection apparatus 100 according to the present embodiment described above with reference to FIG. 2. However, the pedestrian detection apparatus 150 of the first modification example is similar to the pedestrian detection apparatus 100 according to the present embodiment regarding other points.

The vehicle detecting unit 109 that is provided in the pedestrian detection apparatus 150 of the first modification example analyzes the captured image by the onboard camera 2 received from the captured image acquiring unit 101. The vehicle detecting unit 109 detects the position of a vehicle in the captured image and outputs the result to the safety confirmation determining unit 107. Here, the vehicle detecting unit 109 is described as detecting the position of a vehicle by analyzing the captured image. However, various known methods can be used as the method by which the vehicle detecting unit 109 detects the position of a vehicle. For example, the position of a vehicle may be detected based on output from a radar, such as a millimeter-wave radar, a sonar, or the like.

The safety confirmation determining unit 107 acquires the gaze direction of the target pedestrian from the gaze direction acquiring unit 105 and acquires the position of the vehicle from the vehicle detecting unit 109. Then, when the gaze direction of the target pedestrian moves such as to track the movement of the vehicle, the target pedestrian is determined to have performed the safety confirmation regarding vehicles.

As a result, the safety confirmation is determined to be performed when the gaze of the target pedestrian is actually tracking a vehicle. Therefore, whether or not the target pedestrian has performed the safety confirmation regarding vehicles can be even more accurately determined. Consequently, the pedestrian detection apparatus 150 of the modification example can more accurately detect the pre-crossing pedestrian.

C-2. Second Modification Example

As described above with reference to FIG. 12A to FIG. 12C, in the pre-crossing pedestrian detection process according to the present embodiment, the target pedestrian for which the safety confirmation flag and the gaze flag are set to ON within the period going back the predetermined retrospection time from the current point in time is detected as the pre-crossing pedestrian.

However, rather than going back the retrospection time from the current point in time and retrieving the target pedestrian for which the safety confirmation flag and the gaze flag are set to ON, an effective duration over which the ON state effectively continues may be set for each of the safety confirmation flag and the gaze flag. Then, the target pedestrian of which the ON state continues for both the safety confirmation flag and the gaze flag may be detected as the pre-crossing pedestrian.

Figure 15A:
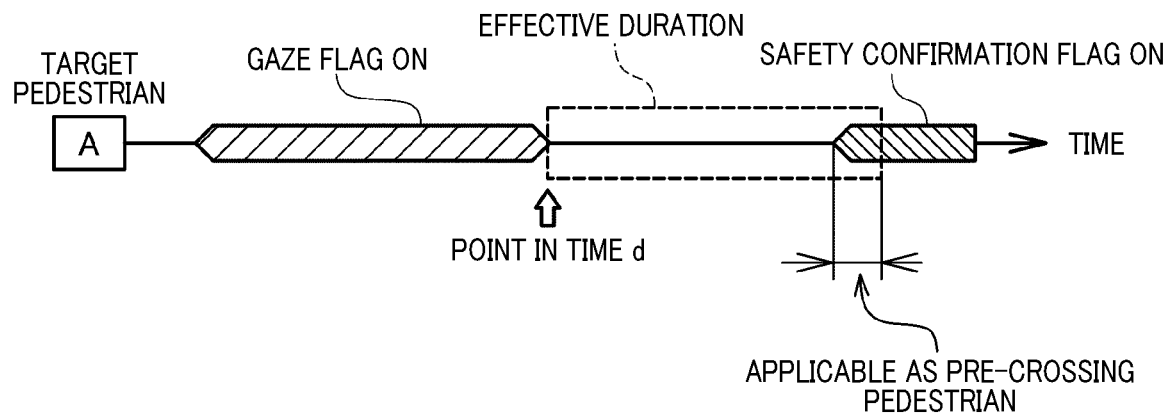
FIG. 15A is an explanatory diagram of a method by which the pre-crossing pedestrian detection process in a second modification example extracts a pre-crossing pedestrian from the target pedestrians.
Figure 15B:
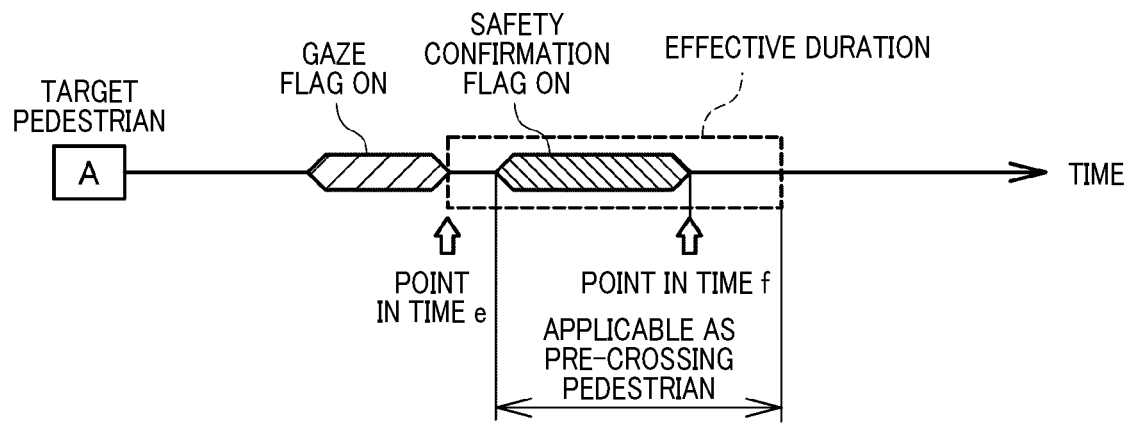
FIG. 15B is an explanatory diagram of the method by which the pre-crossing pedestrian detection process in the second modification example extracts a pre-crossing pedestrian from the target pedestrians.
Figure 15C:
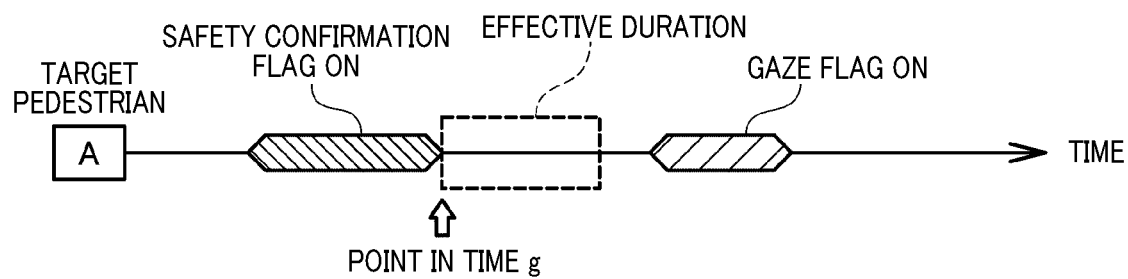
FIG. 15C is an explanatory diagram of the method by which the pre-crossing pedestrian detection process in the second modification example extracts a pre-crossing pedestrian from the target pedestrians.

FIG. 15A to FIG. 15C are explanatory diagrams of a manner in which the pre-crossing pedestrian is detected from the target pedestrians in the pre-crossing pedestrian detection process of the second modification example, described above. For example, in an example shown in FIG. 15A, the effective duration of a predetermined amount of time is set at a point in time d at which the gaze flag for the target pedestrian is changed from ON to OFF. Then, while the safety confirmation flag is set to ON within a period until the elapse of the effective duration from the point in time d, the target pedestrian is detected as the pre-crossing pedestrian.

Here, in the example shown in FIG. 15A, the safety confirmation flag remains set to ON even after the elapse of the effective duration from the point in time d. However, because the effective duration over which the ON state of the gaze flag effectively continues has ended, after the elapse of the effective duration from the point in time d, the target pedestrian is no longer detected as the pre-crossing pedestrian.

In addition, in an example shown in FIG. 15B, the effective duration of a predetermined amount of time is set at a point in time e at which the gaze flag for the target pedestrian is changed from ON to OFF. Then, while the safety confirmation flag is set to ON within the period until the elapse of the effective duration from the point in time e, the target pedestrian is detected as the pre-crossing pedestrian. Then, when the safety confirmation flag is changed from ON to OFF, from this point in time f, the effective duration of the safety confirmation flag is now set. Here, in FIG. 15B, illustration is omitted regarding the effective duration of the safety confirmation flag.

Therefore, even after the safety confirmation flag is set to OFF, the state in which the gaze flag and the safety confirmation flag are set to ON continues until the elapse of the effective duration of the gaze flag. Therefore, the target pedestrian is detected as a pre-crossing pedestrian during this period as well.

Here, in the description above, the description is given using a case in which the gaze flag is initially set to ON and the safety confirmation flag is subsequently set to ON as an example. However, a completely similar description is applicable in a case in which the safety confirmation flag is initially set to ON and the gaze flag is subsequently set to ON.

In addition, in the description above, the gaze flag and the safety confirmation flag are described as having no difference regarding the length of the effective duration. However, the length of the effective duration may differ between the gaze flag and the safety confirmation flag.

For example, as shown in an example in FIG. 15C, the effective duration of the safety confirmation flag is set to a shorter amount of time than the effective duration of the gaze flag shown in the example in FIG. 15A or FIG. 15B.

As described above, the gaze flag is a flag that indicates that the target pedestrian has gazed at the crossing destination. The safety confirmation flag is a flag that indicates that the target pedestrian has performed the safety confirmation regarding vehicles. Once a crossing destination is confirmed, the situation is unlikely to change even as time passes. Therefore, even when time passes after confirming the crossing destination, a pedestrian who is attempting to cross the roadway tends to directly start crossing without reconfirming.

In contrast, regarding the safety confirmation regarding vehicles, the situation is likely to change and no longer be safe as time passes. Therefore, when time passes after performing the safety confirmation, a pedestrian who is attempting to cross the roadway tends to start crossing after performing the safety confirmation again.

Therefore, if the effective duration of the safety confirmation flag is set to a shorter amount of time than the effective duration of the gaze flag, the pre-crossing pedestrian can be even more accurately detected.

The present embodiment and various modification examples are described above. However, the present invention is not limited to the above-described embodiment and various modification examples, and can be carried out according to various modes without departing from the spirit of the invention.

The invention claimed is:

1. A pedestrian detection apparatus that analyzes a captured image acquired from an onboard camera and thereby detects a pedestrian who appears in the captured image, the pedestrian detection apparatus comprising:
   a roadway detecting unit that detects, using one or more processors, a roadway in the captured image;
   a target pedestrian detecting unit that detects, using at least one of the one or more processors, a pedestrian who is present within a range of a predetermined distance in both side directions from the roadway in the captured image as a target pedestrian;
   a gaze direction acquiring unit that acquires, using at least one of the one or more processors, information on a gaze direction of the target pedestrian;
   a gaze determining unit that determines, using at least one of the one or more processors, that the target pedestrian has gazed at a crossing destination that is present on an other side of the roadway, when a condition in which the gaze direction of the target pedestrian is fixed in a direction of the crossing destination that is present on the other side of the roadway is continued for a predetermined gaze time;
   a safety confirmation determining unit that determines, using at least one of the one or more processors, whether the target pedestrian has performed a safety confirmation regarding vehicles traveling on the roadway, based on the gaze direction of the target pedestrian; and
   a pre-crossing pedestrian detecting unit that detects, using at least one of the one or more processors, the target pedestrian who has performed one action of either of gazing at the crossing destination that is present on the other side of the roadway and the safety confirmation, and then performed the other action within a predetermined amount of time as a pre-crossing pedestrian who has an intention to cross the roadway.

2. The pedestrian detection apparatus according to claim 1, wherein:
   the pre-crossing pedestrian detecting unit detects, as the pre-crossing pedestrian, the target pedestrian who has performed the safety confirmation within a first predetermined amount of time after gazing at the crossing destination or has gazed at the crossing destination with a second predetermined amount of time that is shorter than the first predetermined amount of time after performing the safety confirmation.

3. The pedestrian detection apparatus according to claim 2, wherein:
the gaze direction acquiring unit acquires the information on the gaze direction of the target pedestrian by analyzing an image of the target pedestrian appearing in the captured image.

4. The pedestrian detection apparatus according to claim 1, wherein:
the gaze determining unit determines that the target pedestrian is not gazing at the crossing destination when the gaze direction of the target pedestrian is not within an angular range that is within 45 degrees from a direction perpendicular to the roadway.

5. The pedestrian detection apparatus according to claim 4, wherein:
the gaze determining unit determines that the target pedestrian is not gazing at the crossing destination when the gaze direction of the target pedestrian is facing upward at a predetermined upper-limit angle or greater in relation to a horizontal direction.

6. The pedestrian detection apparatus according to claim 5, wherein:
the gaze determining unit determines that the target pedestrian is not gazing at the crossing destination when the gaze direction of the target pedestrian is facing downward at a predetermined lower-limit angle or greater in relation to a horizontal direction.

7. The pedestrian detection apparatus according to claim 6, wherein:
the safety confirmation determining unit determines that the target pedestrian has performed the safety confirmation regarding vehicles traveling on the roadway when the gaze direction of the target pedestrian moves in one direction along a side of the roadway in relation to the target pedestrian over a predetermined angle or greater within a predetermined movement speed range.

8. The pedestrian detection apparatus according to claim 7, further comprising:
a vehicle detecting unit that detects a vehicle that is traveling on the roadway, wherein
the safety confirmation determining unit determines that the target pedestrian has performed the safety confirmation regarding the vehicle when the gaze direction of the target pedestrian moves together with a movement of the vehicle that is traveling on the roadway.

9. The pedestrian detection apparatus according to claim 8, wherein
the safety confirmation determining unit determines that the target pedestrian has performed the safety confirmation regarding vehicles traveling on the roadway when the gaze direction of the target pedestrian moves in one direction of either of left and right when facing the roadway and subsequently moves in the other direction.

10. The pedestrian detection apparatus according to claim 9, wherein:
the safety confirmation determining unit determines that the target pedestrian has performed the safety confirmation regarding vehicles traveling on the roadway when the gaze direction when the gaze direction of the target pedestrian faces one of either of the left and right and the gaze direction when the gaze direction faces the other are separated by 90 degrees or greater.

11. The pedestrian detection apparatus according to claim 10, wherein:
the safety confirmation determining unit determines that the target pedestrian has performed the safety confirmation regarding vehicles traveling on the roadway when the gaze direction of the target pedestrian moves from a direction along the roadway to a direction no longer orthogonal to the roadway, via the direction orthogonal to the roadway.

12. The pedestrian detection apparatus according to claim 1, wherein:
the gaze direction acquiring unit acquires the information on the gaze direction of the target pedestrian by analyzing an image of the target pedestrian appearing in the captured image.

13. The pedestrian detection apparatus according to claim 4, wherein:
the gaze determining unit determines that the target pedestrian is not gazing at the crossing destination when the gaze direction of the target pedestrian is facing upward at a predetermined upper-limit angle or greater in relation to a horizontal direction.

14. The pedestrian detection apparatus according to claim 4, wherein:
the gaze determining unit determines that the target pedestrian is not gazing at the crossing destination when the gaze direction of the target pedestrian is facing downward at a predetermined lower-limit angle or greater in relation to a horizontal direction.

15. The pedestrian detection apparatus according to claim 1, wherein:
the safety confirmation determining unit determines that the target pedestrian has performed the safety confirmation regarding vehicles traveling on the roadway when the gaze direction of the target pedestrian moves in one direction along a side of the roadway in relation to the target pedestrian over a predetermined angle or greater within a predetermined movement speed range.

16. The pedestrian detection apparatus according to claim 1, wherein
the safety confirmation determining unit determines that the target pedestrian has performed the safety confirmation regarding vehicles traveling on the roadway when the gaze direction of the target pedestrian moves in one direction of either of left and right when facing the roadway and subsequently moves in the other direction.

17. The pedestrian detection apparatus according to claim 1, wherein:
the safety confirmation determining unit determines that the target pedestrian has performed the safety confirmation regarding vehicles traveling on the roadway when the gaze direction of the target pedestrian moves from a direction along the roadway to a direction no longer orthogonal to the roadway, via the direction orthogonal to the roadway.

18. A pedestrian detection method for analyzing a captured image acquired from an onboard camera and thereby detecting a pedestrian who appears in the captured image, the pedestrian detection method comprising:
detecting a roadway in the captured image;
detecting a pedestrian who is present within a range of a predetermined distance in both side directions from the roadway in the captured image as a target pedestrian;
acquiring information on a gaze direction of the target pedestrian;
determining that the target pedestrian has gazed at a crossing destination that is present on an other side of the roadway, when a condition in which the gaze direction of the target pedestrian is fixed in a direction of the crossing destination that is present on the other side of the roadway is continued for a predetermined gaze time;

determining whether the target pedestrian has performed a safety confirmation regarding vehicles traveling on the roadway, based on the gaze direction of the target pedestrian; and detecting the target pedestrian who has performed one action of either of gazing at the crossing destination that is present on the other side of the roadway and the safety confirmation, and then performed the other action within a predetermined amount of time as a pre-crossing pedestrian who has an intention to cross the roadway.

* * * * *